(12) United States Patent
Xie et al.

(10) Patent No.: US 10,685,200 B2
(45) Date of Patent: Jun. 16, 2020

(54) METHOD FOR CONTROLLING STRESS DISTRIBUTION IN MATERIAL AND READING STRESS INFORMATION

(71) Applicant: ZHEJIANG UNIVERSITY, Zhejiang (CN)

(72) Inventors: Tao Xie, Zhejiang (CN); Jingjun Wu, Zhejiang (CN); Qian Zhao, Zhejiang (CN); Guogao Zhang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 35 days.

(21) Appl. No.: 16/152,383

(22) Filed: Oct. 4, 2018

(65) Prior Publication Data

US 2019/0108378 A1    Apr. 11, 2019

(30) Foreign Application Priority Data

Oct. 10, 2017    (CN) .......................... 2017 1 0935159

(51) Int. Cl.
| | |
|---|---|
| *C08F 2/46* | (2006.01) |
| *C08F 2/50* | (2006.01) |
| *C08G 61/04* | (2006.01) |
| *G06K 7/14* | (2006.01) |
| *C08F 293/00* | (2006.01) |
| *C08J 3/24* | (2006.01) |
| *G05D 15/01* | (2006.01) |

(52) U.S. Cl.
CPC ........ *G06K 7/1417* (2013.01); *C08F 293/005* (2013.01); *C08J 3/248* (2013.01); *C08F 2438/03* (2013.01); *C08J 2333/04* (2013.01); *C08J 2367/04* (2013.01); *C08J 2375/06* (2013.01); *G05D 15/01* (2013.01)

(58) Field of Classification Search
CPC . G06K 7/1417; C08J 2375/06; C08J 2367/04; C08J 3/248; C08J 2333/04; G05D 15/01; C08F 293/005; C08F 2438/03
USPC ....................... 522/71, 1, 189, 184, 6; 520/1
See application file for complete search history.

(56) References Cited

U.S. PATENT DOCUMENTS

2007/0132156 A1 * 6/2007 Burgermeister ........ A61L 31/04
264/479

FOREIGN PATENT DOCUMENTS

CN          105713216       *   6/2016

OTHER PUBLICATIONS

Fang et al, CN105713216 Machine Translation, Jun. 29, 2016 (Year: 2016).*

* cited by examiner

*Primary Examiner* — Jessica Whiteley
(74) *Attorney, Agent, or Firm* — JCIPRNET

(57) ABSTRACT

The invention relates to a method for controlling the stress distribution in a material, comprising the steps of: a, preparing a crosslinked polymer containing reversible exchange bonds; b, applying an external force to the crosslinked polymer to cause a certain strain; c, specific region of the crosslinked polymer is selectively heated while maintaining the strain. This method controls and utilizes the internal stresses which are commonly considered as unfavorable. The invention also provides a method for reading information in a polarized light field, wherein the crosslinked polymer treated by the method is transparent under natural light. The information therein can be read only under polarized light, and possesses concealment.

10 Claims, 3 Drawing Sheets

METHOD FOR CONTROLLING STRESS DISTRIBUTION IN MATERIAL AND READING STRESS INFORMATION

CROSS-REFERENCE TO RELATED APPLICATION

This application claims the priority benefit of China patent application serial no. 201710935159.6, filed on Oct. 10, 2017. The entirety of the above-mentioned patent application is hereby incorporated by reference herein and made a part of the specification.

BACKGROUND OF THE INVENTION

Technical Field

The invention relates to the field of application of crosslinked polymers, in particular to a method for controlling stress distribution in materials and a method for reading information.

Background

Stress refers to the force of an object in a unit area, and it emphasizes the distribution of force inside the object. When an object is subjected to an external force, a stress against the external force is generated inside the object which is called internal stress.

Internal stress is generally considered to be detrimental during the processing of polymers because it can cause stress cracking and warpage during use. The essence of this phenomenon is the unstable conformation formed by the macromolecular chain during the melt processing. This unstable conformation cannot be immediately restored to the stable conformation compatible with environmental conditions during cooling and solidification. This corresponds to a reversible elastic deformation, and the frozen elastic deformation is stored in the plastic product in the form of potential energy. Under suitable conditions, the unstable conformation will transform into a stable conformation, and the potential is released as kinetic energy. When the force the intertwining force between the macromolecular chains cannot withstand such kinetic energy, the internal stress balance is destroyed and the plastic products are subject to stress cracking and warping deformation.

The internal stress has a great influence on the mechanical properties, optical properties, electrical properties, etc. of the polymer material. Internal stress is a disadvantage in polymer processing as the internal stress during processing is uncontrollable and unpredictable and it negatively affects the material properties. If we can control the distribution of stress inside the material, we can provide a new method to control the optical properties, electrical properties, mechanical properties, etc. of polymer materials.

DETAILED DESCRIPTION OF THE EMBODIMENTS

Figure 1:
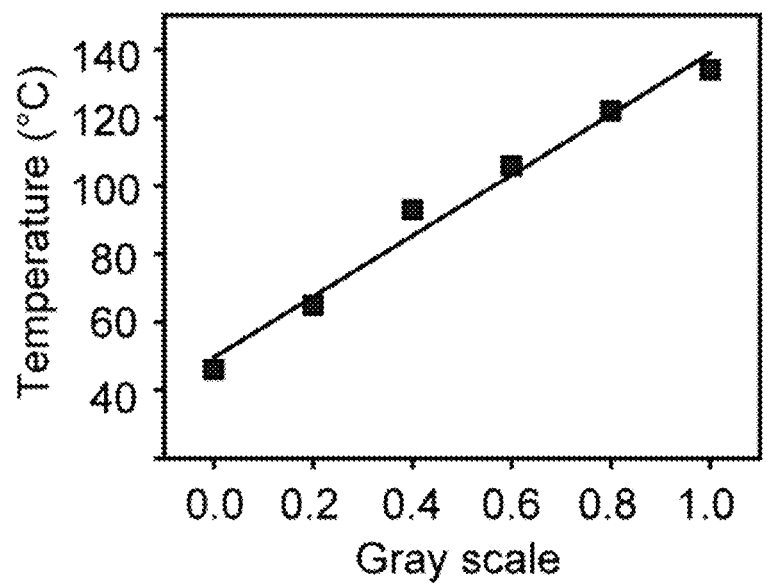
FIG. 1 is the photothermal effect of ink printed on the material synthesized in Example 1.

This present invention provides a method for controlling the stress distribution in a material, and utilizing the otherwise unfavorable internal stress considered in the prior art.

The technical solution provided by the invention is:

A method of controlling stress distribution within a material, comprising the steps of:

a, preparing a crosslinked polymer containing reversible exchange bonds;

b, applying an external force to the crosslinked polymer to cause a certain strain;

c, selective heating of a specific region of the crosslinked polymer while maintaining the strain.

In the above technical solution, the crosslinked polymer containing reversible exchange bonds is deformed by an external force to form an internal stress. After that, selective heating of a specific region of the crosslinked polymer activates the reversible bond exchange of the heated portion, and the topology of the polymer network is rearranged to relax and dissipate the internal stress in the region. In the non-heated area, the polymer network structure remains unchanged and the internal stress remain unchanged. Therefore, by selectively heating a specific region, the stress distribution inside the polymer material can be controlled. Further, by controlling the temperature, the degree of stress relaxation in the region can be controlled. Therefore, it is possible to accurately control the presence and magnitude of stress in a specific region through the above heating method.

Wherein, the reversible exchange bonds in step a are a type of dynamic bonds which undergo cleavage-recombination at a specific temperature, including but not limited to: Diels-Alder (DA) reaction bond, ester bond, urethane bond, urea bond, metal coordinate bond, supramolecular bonds. The crosslinked polymer containing reversible exchange bonds may be a polyurethane resin, a polyurethane urea resin, an acid/anhydride cured epoxy resin, a silicone resin or crosslinked polymer containing ester bonds, urethane bonds, urea bonds, silicone-oxygen bonds, hydrogen bonds, metal coordinate bonds, and DA reaction bonds.

In specific embodiments, the crosslinked polymer in the step a may be in a different shape such as a film.

The preparation method of the crosslinked polymer containing reversible exchange bonds can employ a preparation method in the prior art.

In specific embodiments, the crosslinked polymer containing reversible exchange bonds is formed by reacting a precursor containing reversible exchange bonds with corresponding crosslinking agents.

In specific embodiments, the precursor containing reversible exchange bonds may be chosen from saturated polyester polyol, saturated polyester containing a terminal double bond, unsaturated polyester, reactive polysiloxane, reactive monomer containing a hydrogen bond, reactive monomer containing metal coordinate bonds and reactive monomer containing DA reaction bonds and the like.

In specific embodiments, the saturated polyester polyol is chosen from polycaprolactone diol, polyethyleneglycol adipate, polyethyleneglycol-propyleneglycol adipate, polydiethyleneglycol adipate, poly-1,4-butyleneglycol adipate, polyethylene glycol-1,4-butylene glycol adipate, or a combination thereof. The crosslinking agents can be polyacid, polyisocyanate, and those that react with polyol. Advantageously, the crosslinking agents can be polyisocyanate, including but not limited to diphenylmethane diisocyanate (MDI), 2,4-tolylene diisocyanate(TDI), hexamethylene diisocyanate(HDI), triphenylmethane-triisocyanate, polyHDI, polyMDI, and polyTDI.

In specific embodiments, polycaprolactone diacrylate is chosen for the saturated polyester with vinyl end groups. The crosslinking agents could be thiol containing agents, including but not limited to pentaerythritol tetrakis(3-mercaptopropionate), pentaerythritol tetrakis(2-mercaptoacetate), Trimethylolpropane tris(3-mercaptopropionate), or a combination thereof.

In specific embodiments, the unsaturated polyester is chosen from unsaturated polyester resin of phthalic type, terephthalic type, bisphenol A type, or flame-retardant unsaturated polyester and other specific functional unsaturated polyester resin. The crosslinking agents should contain vinyl groups, including but not limited to styrene, vinyl toluene, ethyl acrylate, methyl methacrylate, 1,2-divinylbenzene, diallyl phthalate, triallyl cyanurate.

The reactive hydrogen bond polymer is synthesized by a chemical reaction from a monomer or precursor containing a hydrogen bond. In specific embodiments, the hydrogen bond-containing monomer may be selected from 2-ureido-4[1H]-pyrimidinone (Formula a) containing thiol group, (meth) acrylate bond, amino group or epoxy group, etc. The monomers and other reactive monomers can be crosslinked by a specific chemical reaction to form a thermosetting supramolecular resin. The thiol-containing hydrogen bond polymer may be crosslinked by thiol-ene reaction with a vinyl group-containing crosslinking agent, or may be crosslinked by Michael addition reaction with (meth) acrylate bond-containing crosslinking agent. The amino group-containing hydrogen bond polymer can be crosslinked by reacting with an epoxy group-containing crosslinking agent.

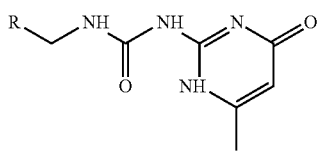

Formula a

Wherein R=—SH, —CH=CH$_2$, —NH$_2$, —(CHCH$_2$O).

The reactive metal coordination bond polymer is synthesized by a chemical reaction from a monomer or a precursor containing metal coordination bonds. In specific embodiments, the monomer containing metal coordination bonds may be selected from 4'-Chloro-2,2':6',2''-terpyridine (Formula b) containing thiol group, (meth)acrylate bond, amino group or epoxy group. These monomers and other reactive monomers can be crosslinked by specific chemical reactions to form thermosetting supramolecular resins containing metal coordination bonds. The thiol group-containing metal coordination polymer may be crosslinked by thiol-ene reaction with a vinyl group-containing crosslinking agent, or may be crosslinked by Michael addition reaction with (meth)acrylate bond-containing crosslinking agent. The amino group-containing metal coordination polymer can be crosslinked by reacting with the epoxy group-containing crosslinking agent.

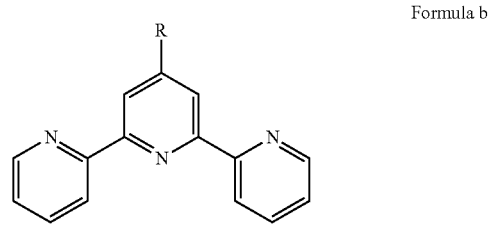

Formula b

Wherein R=—SH, —CH=CH$_2$, —NH$_2$, —(CHCH$_2$O).

The reactive DA bond polymer is synthesized by a chemical reaction from a monomer or a precursor containing DA reaction bond. In specific embodiments, the monomer containing DA reaction bond may be selected from DA monomer (Formula c) containing thiol group, (meth)acrylate bond, amino group or epoxy group. These monomers may be reacted with other reactive monomers to form thermosetting supramolecular resin containing DA reaction bonds. The thiol group-containing DA bond polymer may be crosslinked by thiol-ene reaction with a vinyl group-containing crosslinking agent, or may be crosslinked by Michael addition reaction with a (meth) acrylate bond-containing crosslinking agent. The amino group-containing DA bond polymer can be crosslinked by reacting with an epoxy group-containing crosslinking agent.

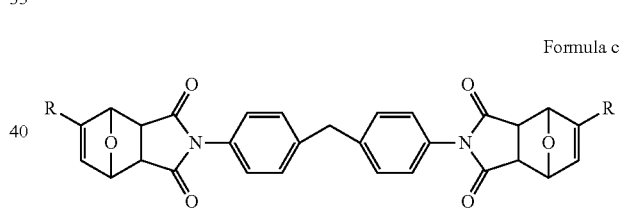

Formula c

Wherein R=—SH, —CH=CH$_2$, —NH$_2$, —(CHCH$_2$O).

In specific embodiments, the cross-linking polymer containing a reversible exchange bond may also be formed by reacting a precursor not containing a reversible exchange bond with a corresponding cross-linking agent to form a reversible exchange bond.

In specific embodiments, the precursor which does not contain a reversible exchange bond is an epoxy compound, and is obtained by reacting an epoxy compound with a suitable crosslinking agent to form an ester bond as a crosslinking site.

When the ester bonds are the reaction product of crosslinking process of non-ester bearing polymer precursor, the precursor could be epoxy resin. The potential optimized choices are phenolic epoxy resin, bisphenol A diglycidyl ether, bisphenol F dglycidyl ether, diglycidyl ether of tetrabromobispehol-A, 1,6-Hexanediol diglycidyl ether, bisphenol A ethylene glycol diglycidyl ether, epoxidized polyunsaturated fatty acid, epoxidized vegetable oils, or a combination thereof. The counterpart reactants for crosslinking reaction should be appropriate polyacids or anhydrides that react with epoxy to generate ester as the crosslinking sites.

In specific embodiments the polyacids are chosen from fatty acids with 2-40 carbon (glutaric acid, adipic acid, heptanedioic acid, suberic acid, azaleas acid, decanedioicacid, dodecanedioic acid, etc) and their combination, oligomer unsaturated fatty acids (10-hendecenoic acid, palmitoleic acid, oleic acid, linoleic acid, α-Linolenic acid, ricinoleic acid, erucic acid, etc), or aromatic diacids with 2-40 carbon (phthalate acid, trimellitic acid, terephthalic acid, naphthalic acid, etc.) and their combination. The potential choices for anhydrides cover o-phthalic anhydride, methyl Nadie anhydride, hexahydrophthalic anhydride, dodeceny succinicanhydride, glutaric anhydride, etc.) and their combination.

A catalyst should be added to the above-mentioned composition to induce the transesterification process. In specific embodiments, the catalyst is chosen from salts of tin, zinc, magnesium, cobalt, calcium, titanium and zirconium. The catalyst may also be chosen from catalyst of organic nature, such as 1,5,7-triazabicyclo[4.4.0]dec-5-ene, benzyldimethylamide, benzyltrimethylammonium chloride.

Advantageously, the catalyst is chosen from: 1,5,7-triazabicyclo[4.4.0]dec-5-ene, benzyldimethylamide and zinc acetylacetonate.

The catalyst is used in this invention in an amount larger than 0.5% by weight relative to the ester bearing crosslinking polymer.

When the reversible exchange bond in the above crosslinked polymer is DA reaction bond, hydrogen bond, or metal coordination bond, it is not necessary to introduce a catalyst.

In specific embodiments, in the step b if the glass transition temperature ($T_g$) of the crosslinked polymer is higher than room temperature, after the crosslinking polymer is strained, the temperature is lowered below $T_g$ to fix the strain, and the external force is removed. Otherwise, an external force is always maintained to keep the strain.

In step b the external force is introduced into the material by means of post-treatment, for example, by stretching, compressing, twisting, etc. If the crosslinked polymer has a $T_g$ higher than room temperature, the crosslinked polymer should first be heated to a temperature above $T_g$ and then an external force is applied. After a certain strain is generated, the internal stress formed inside the material can be fixed through cooling below $T_g$ (no need to continuously apply external force). Conversely, if the $T_g$ of the crosslinked polymer is lower than room temperature, the external force needs to be continuously applied to maintain internal stress, otherwise stress will disappear due to shape recovery of the material.

When an external force is applied to the crosslinked polymer containing the reversible exchange bond, the polymer material generates a corresponding internal stress. At this time, the key step is to selectively heat a specific region while maintaining the internal stress. The heating temperature varies depending on the reversible exchange bond contained in the crosslinked polymer. The bond exchange of reversible bonds is a kinetic process, which means the higher the temperature the faster the exchange of bonds. For crosslinked polymers having a $T_g$ above room temperature, below the $T_g$ the polymer segments are frozen and the bond exchange is negligible, and heating above $T_g$ is required to activate the reversible exchange bonds.

In specific embodiments, the selective heating in the step c is scanning and heating according to a certain path by using a laser. With the laser used in the selective laser sintering 3D printing technology, combined with the mirror galvanometer and computer aided system, it is possible to selectively heat the surface of the above polymer material according to a certain path. The power of the heating, that is, the temperature of the polymer material, can be accurately regulated by controlling the power of the laser and the speed of the scanning.

The digital light source heating method is also used in the present application, that is, the heated area and the degree of heating can be controlled by computer. Digital heating can be used in the following ways:

In specific embodiments, the selective heating in the step c is: direct regional heating using a digital infrared light source. Infrared light has a strong thermal effect and can be used for non-contact heating of polymeric materials. Using a projector based on the Texas Instruments Infrared Digital Light Processing System (NIR DLP), the computer controls the pattern and intensity of the projected infrared light to achieve digital control of the heating zone and heating level.

In specific embodiments, when the crosslinked polymer containing the reversible exchange bond is prepared in the step a, the photothermal agent is introduced inside or on the surface of the crosslinked polymer; and the selective heating in the step c is: selecting the indirect regionalized surface projection heating of the digital light source matched by the photothermal agent.

In order to increase the thermal effect of the above laser or infrared heating, a photothermal agent may be introduced into the crosslinked polymer system. The above photothermal agent may be added during the synthesis of the polymer or deposited by solution deposition or spray deposition on the surface of the polymer after the synthesis of the polymer. The digitized surface light source matched with the above photothermal agent is selected to regionally heat the crosslinked polymer through the photothermal effect. In specific embodiments, a digitized surface light source having a wavelength greater than 800 nm can be selected.

In specific embodiments, when the crosslinked polymer containing the reversible exchange bonds is prepared in the step a, a photothermnnal agent is regionally deposited on the surface of the crosslinked polymer. The selective heating in the step c is irradiated globally using the light source matched with the photothermal agent.

Photothermal agents are a class of materials that efficiently convert light of a specific wavelength into heat, including carbon materials, metals, rare earth organic ligands, and the like. In specific embodiments, the photothermal agent is selected from the group consisting of graphite, carbon nanotubes, graphene, and an organic ligand of gold, neodymium, samarium, and iridium.

In specific embodiments, the photothermal agent deposited on the surface of the crosslinked polymer specifically comprises: preparing printer toner with photothermal effects, and printing grayscale images of a particular pattern on the surface of the crosslinked polymer by computer graphics assisting software.

The invention also provides a method for information reading in a polarized light field, comprising the following steps:

a, preparing a crosslinked polymer film containing a reversible exchange bond;

b, applying an external force to the crosslinked polymer film to cause a certain strain;

c, selectively heating a specific region of the crosslinked polymer film while maintaining the strain of the crosslinked polymer film;

d, the crosslinked polymer film was placed in front of the polarized light source, and the pattern was observed by using a polarizing plate.

The above technical solutions are based on photoelasticity phenomena. Some materials are optically isotropic amorphous materials, such as epoxy resin, plexiglass, polycarbonate, etc., without birefringence when not subjected to external forces. However, when they are subjected to external force, they exhibit light anisotropy and birefringence phenomenon. When the external force is removed, it returns to the original isotropic state. This phenomenon is called temporary birefringence.

By regionally controlling the distribution of stress in the material, it is possible to regionally control the presence or absence of the birefringence phenomenon in the material. And the areas with stress will exhibit color distribution under the polarized light field (dark field) due to the phenomenon of birefringence. The color distribution is determined by the stress distribution, and areas without stress remain isotropic and have no color (i.e. black).

In specific embodiments, the method for reading information in a polarized light field comprises the following steps:

a, preparing crosslinked polymer films containing reversible exchange bonds;

b, preparing printer toner with photothermal effects, and printing grayscale image on the surface of the crosslinked polymer film using printer;

c, applying an external force to the crosslinked polymer film to cause a certain strain;

d, selectively heating a specific region of the crosslinked polymer film while maintaining the strain;

e, observing the pattern displayed by the crosslinked polymer film using a polarizing plate in polarized light.

The method of controlling the stress in the material is based on laser printing technology. The required printer accuracy is usually above 300 dpi. The ink used is based on toner and has a photothermal effect (i.e., the temperature is raised under infrared radiation), and the higher the gray level (i.e., the darker), the stronger the photothermal effect and the higher the temperature under infrared radiation. That is to say, the temperature can be controlled regionally under infrared radiation by laser printing technology. For the crosslinked polymer films containing reversible exchange bonds, the higher the temperature, the faster the stress relaxation and the less the remaining stress. Thereby, it is possible not only to control the presence or absence of stress in the material, but also to control the magnitude of the internal stress.

By computer-controlled gray scale distribution of the pattern, a specific gray scale image is printed on the surface of the polymer film, and the polymer film which has been introduced with internal stress can form a stress map of the pattern under infrared light irradiation. The remaining stress of high gray-scale area is small, and the remaining stress of low gray-scale area is large. After the ink is erased, the material remains colorless and transparent under natural light, but under the polarized light field (dark field) the color appears with different colors corresponding to different stresses.

Compared with the prior art, the beneficial effects of the present invention are embodied in:

a, the method provided by the present invention can control the internal stress distribution of the crosslinked polymer, and utilize the internal stress of the unfavorable factor considered in the prior art.

b, the crosslinked polymer treated by the method provided by the present invention is transparent under natural light, and the information therein can be read only under polarized light.

c, the crosslinked polymer treated by the method of the present invention can be repeatedly erased and rewritten information for a plurality of cycles, and there is theoretically no upper limit on the number of cycles.

d, the method provided by the present invention is simple in operation and suitable for information recording with high security requirements.

EXPERIMENTAL SECTION

The embodiments are further illustrated by the following specific examples, but the scope of the invention is not limited to the scope of the embodiments.

Example 1

Materials:

Polycarprolactone diacrylate (PCLDA): Mw=10,000, from Sigma-Aldrich, molecular structure as follows:

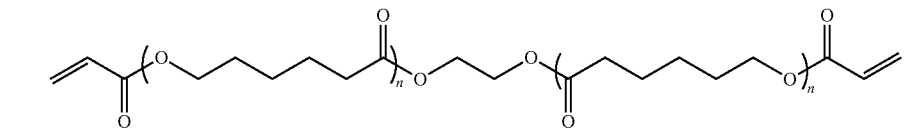

Pentaerythritol tetrakis(3-mercaptopropionate) (Tetrathiol): from Sigma-Aldrich, molecular structure as follows:

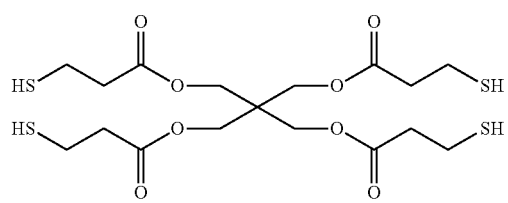 [SMILES: O=C(CCS)OCC(COC(=O)CCS)(COC(=O)CCS)COC(=O)CCS]

1-Hydroxylcyclohexyl phenyl ketone (UV-184): from Tokyo Chemical Industry (TCI)

1,5,7-triazabicyclo[4.4.0]dec-5-ene (TBD): from TCI

N,N-Dimethylformamide (DMF): from Aladdin (Shanghai)

Preparation Methods:

Take 1 mmol PCLDA and 0.5 mmol Tetrathiol into 10 ml DMF (acrylate:thiol=1:1, molar ratio) and elevate the temperature to 80° C. to obtain a thoroughly uniform solution. Then add UV-184 (0.5% w.t.) and TBD (2% w.t.) in and further stir the solution. Pour the solution into a sealed glass mold and expose the mold under 365 nm UV for 5 minutes for curing. The obtained film is taken out and dried under vacuum for 24 h at 100° C.

Stress Adjustment and Observation:

The above polymer film was placed in a printer to print a specific gray pattern, and then heated to 70° C., uniaxially stretched, cooled, and the external force was removed. The film was placed under infrared radiation (808 nm) for a specific time.

FIG. 1 shows the temperature rise of the film printed with the gray pattern after the infrared irradiation for 5 minutes. When the gray scale is 1, the temperature rises to 135° C.; when the gray scale is 0, the temperature is about 38° C.

Figure 2:
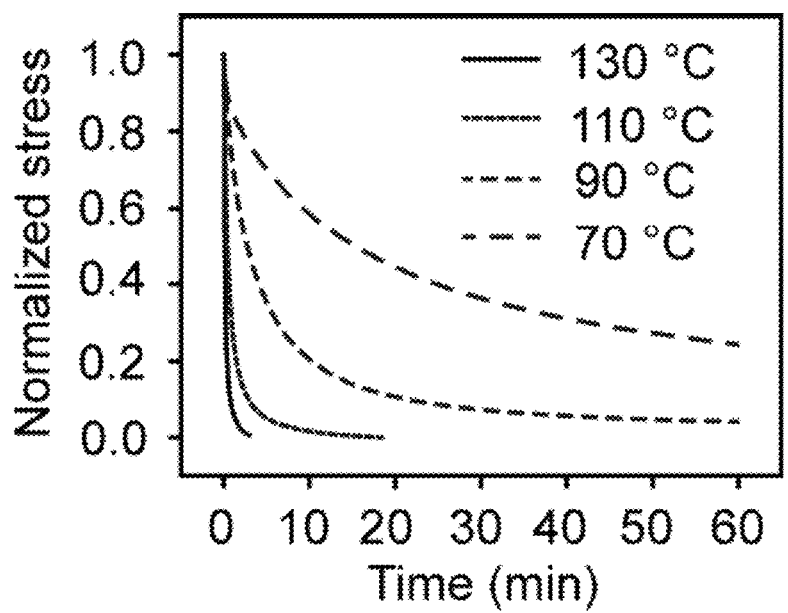
FIG. 2 is the stress relaxation curve at different temperatures of the material synthesized in Example 1.

FIG. 2 shows the stress relaxation of the crosslinked polymer at different temperatures. The higher the temperature, the faster the stress relaxation. Full stress relaxation at 100° C. requires only 10 minutes, while it takes about 25 minutes for the stress to be fully relaxed at 90° C. Therefore, the remaining stress can be controlled by controlling the temperature (gray scale) and time.

Figure 3:
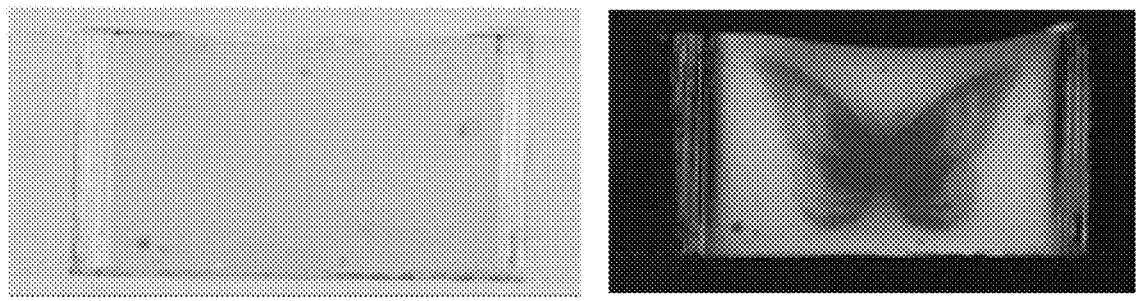
FIG. 3 shows that pattern printed on the material synthesized in Example 1 is invisible (left) under natural light and visible (right) in polarized light.

When the fabricated material is placed in the polarized light and observed with a polarizing plate. As shown in FIG. 3, the material remains colorless and transparent under natural light (left), and the information recorded in the materials can be seen in the polarized light field (dark field). Here the specific shape is the butterfly (right).

Example 2

Materials:
a) Polycarprolactone diacrylate (PCLDA): Mw=10,000, from Sigma-Aldrich
b) Pentaerythritol tetrakis(3-mercaptopropionate) (Tetrathiol): from Sigma-Aldrich
c) Triethylamine (TEA): from TCI
d) 1,5,7-triazabicyclo[4.4.0]dec-5-ene (TBD): from TCI
e) N,N-Dimethylformamide (DMF): from Aladin (Shanghai)

Preparation Methods:
Take 1 mmol PCLDA and 0.5 mmol Tetrathiol into 20 ml DMF (acrylate:thiol=1:1, molar ratio) and elevate the temperature to 80° C. obtain a uniform solution. Then add TEA (0.5% w.t.) and TBD (2% w.t.) in and further stir the solution. Pour the solution into a sealed glass mold and place the mold at 60° C. oven for 4 hours for curing. The obtained film is taken out and dried under vacuum for 24 h at 100° C.

Stress Adjustment and Observation:
The above polymer film was heated to 60° C., uniaxially stretched, cooled, and the external force was removed. Scanning heating is performed on the surface of the film in a specific path using a laser.

Figure 4:
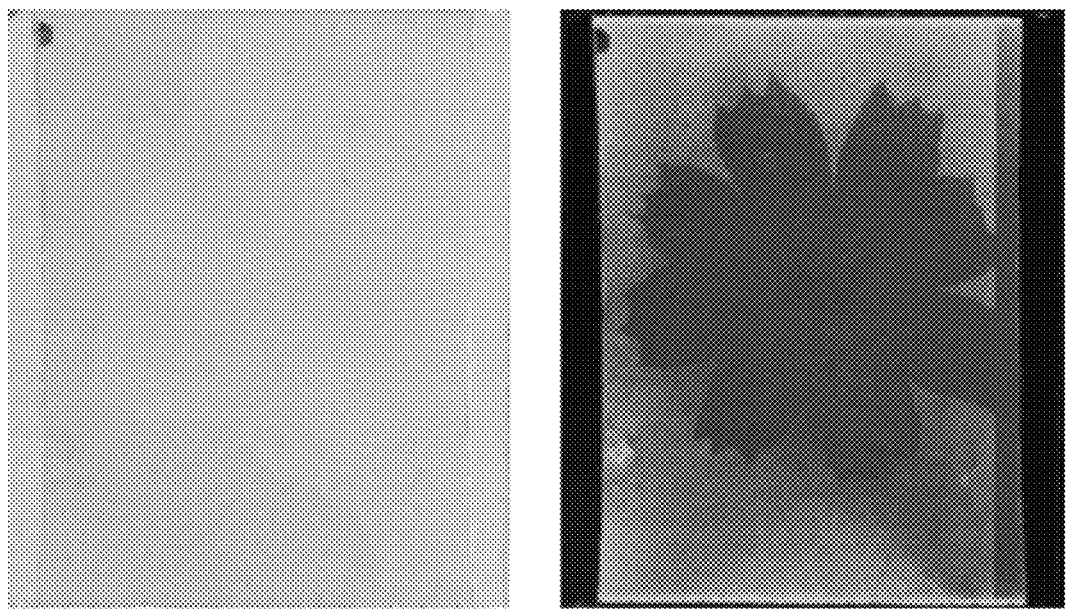
FIG. 4 shows that pattern printed on the material synthesized in Example 2 is invisible (left) under natural light and visible (right) in polarized light.

When the fabricated material is placed in the polarized light and observed with a polarizing plate, as shown in FIG. 4 the material remains colorless and transparent under natural light (left), and the information recorded in the materials can be seen in the polarized light field (dark field). Here the specific shape is the flower (right).

Example 3

Materials:
a) Unsaturated polyester oligomer: phthalic acid type, 15% w.t. maleic anhydride
b) Styrene: from Aladdin (Shanghai)
c) 1-Hydroxylcyclohexyl phenyl ketone (UV-184): from TCI
d) Cobaltous naphthenate: from Aladin (Shanghai)
e) 1,5,7-triazabicyclo[4.4.0]dec-5-ene (TBD): from TCI Preparation Methods:
Mix 6.5 g unsaturated polyester oligomer, 3.5 g styrene, 0.1 g UV-184, 0.05 g cobaltous naphthenate and 0.2 g TBD together and pour the uniform solution into the aluminum plate then place the plate into the oven at 50° C. for 2 hours, followed by 80° C. for 5 hours to obtain the thermoset unsaturated polyester.

Stress Adjustment and Observation:
The above polymer film was placed in an inkjet printer to print a specific graypattem, and then heated to 80° C., uniaxially stretched, cooled, and the external force was removed. The film was placed under an infrared bulb (808 nm) for a specific time.

Figure 5:
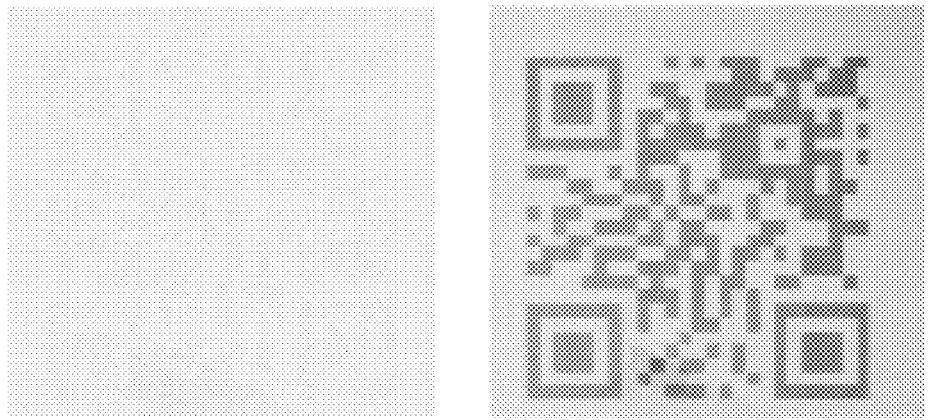
FIG. 5 shows that pattern printed on the material synthesized in Example 3 is invisible (left) under natural light and visible (right) in polarized light.

When the fabricated material is placed in the polarized light and observed with a polarizing plate, as shown in FIG. 5 the material remains colorless and transparent under natural light (left), and the information recorded in the materials can be seen in the polarized light field (dark field). Here the specific shape is a quick response code (right).

Example 4

Materials:
a) Bisphenol A diglycidyl ether (DGEBA): Mw=340, from Aladdin (Shanghai)
b) Glutaric anhydride: Mw=114, from Aladin (Shanghai)
c) 1,5,7-triazabicyclo[4.4.0]dec-5-ene (TBD): from TCI
d) N,N-Dimethylformamide (DMF): from Aladin (Shanghai)

Preparation Methods:
Take 1 mmol DGEBA and 1 mmol glutaric anhydride into 20 ml DMF (acrylate:
thiol=1:1, molar ratio) and elevate the temperature to 100° C. to get the thoroughly uniform solution. Then add TBD (2%) in and further stir the solution. Pour the solution into a PTFE mold and place the mold at 130° C. oven for 4 h for curing.

Stress Adjustment and Observation:
The above polymer film was heated to 40° C., uniaxially stretched, cooled, and the external force was removed. A specific pattern is projected onto the film using a digital DLP projector.

Figure 6:
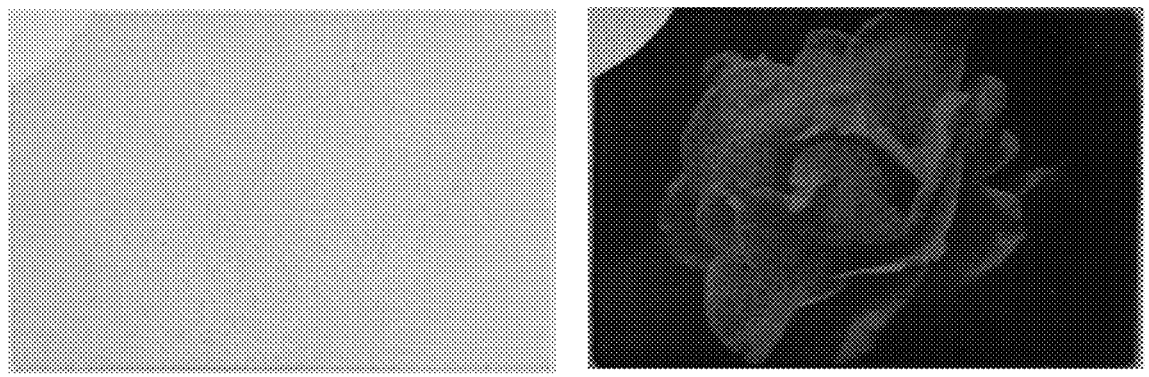
FIG. 6 shows that pattern printed on the material synthesized in Example 4 is invisible (left) under natural light and visible (right) in polarized light.

When the fabricated material is placed in the polarized light and observed with a polarizing plate, as shown in FIG. 6 the material remains colorless and transparent under natural light (left), and the information recorded in the materials can be seen in the polarized light field (dark field). Here the specific shape is the rose (right).

Example 5

Materials:
a) Polycarprolactone diol (PCL diol): Mw=10,000, from Sigma-Aldrich, molecular structure as follows:

b) Hexamethylene diisocyanate (HDI): from Sigma-Aldrich, CAS: 28182-81-2, molecular structure as follows:

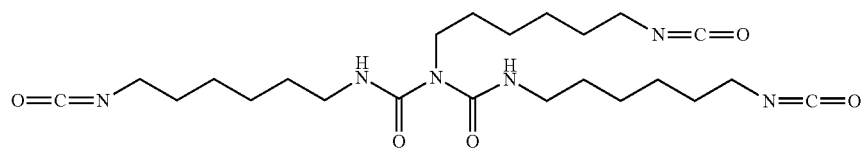 [SMILES: O=C=NCCCCCCNC(=O)N(CCCCCCN=C=O)C(=O)NCCCCCCN=C=O]

c) Dibutyltin dilaurate (DBTDL): from TCI
d) 1,5,7-triazabicyclo[4.4.0]dec-5-ene (TBD): from TCI
e) N,N-Dimethylformamide (DMF): from Aladdin (Shanghai)

Preparation Methods:

Take 0.3 mmol PCL and 0.2 mmol HDI into 10 ml DMF (hydroxy:isocynate=1:1, molar ratio) and elevate the temperature to 80° C. to get the thoroughly uniform solution. Then add DBTDL (0.5% w.t.) and TBD (2% w.t.) in and further stir the solution. Pour the solution into a mold and place the mold at 90° C. for 12 h for curing. The obtained film is taken out and dried under vacuum for 24 h at 100° C.

Stress Adjustment and Observation:

The above polymer film was heated to 40° C., uniaxially stretched, cooled, and the external force was removed. A specific pattern is projected on the film using a digital near infrared DLP projector.

Figure 7:
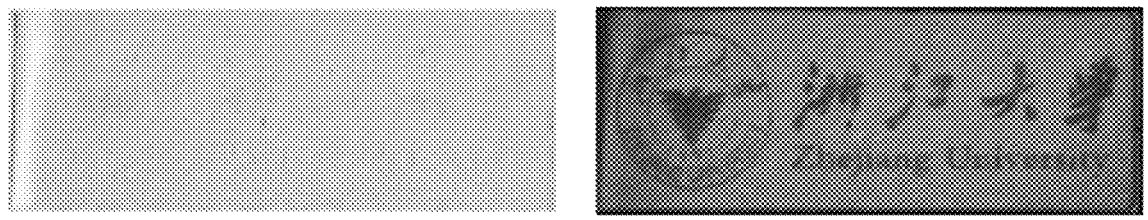
FIG. 7 shows that pattern printed on the material synthesized in Example 5 is invisible (left) under natural light and visible (right) in polarized light.

When the fabricated material is placed in the polarized light and observed with a polarizing plate, as shown in FIG. 7 the material remains colorless and transparent under natural light (left), and the information recorded in the materials can be seen in the polarized light field (dark field). Here the specific shape is a logo (right).

Example 6

Materials:
a) Polycarprolactone diol (PCL diol): Mw=10,000, from Sigma-Aldrich
b) Triphenylmethane-4,4',4"-triisocyanate: from Sigma-Aldrich
c) Dibutyltin dilaurate (DBTDL): from TCI
d) 1,5,7-triazabicyclo[4.4.0]dec-5-ene (TBD): from TCI
e) N,N-Dimethylformamide (DMF): from Aladdin (Shanghai)

Preparation Methods:

Take 0.3 mmol PCL and 0.2 mmol HDI into 10 ml DMF (hydroxy:isocynate=1:1, molar ratio) and elevate the temperature to 80° C. to get the thoroughly uniform solution. Then add DBTDL (0.5% w.t.) and TBD (2%) in and further stir the solution. Pour the solution into a mold and place the mold at 90° C. for 12 h for curing. The obtained film is taken out and dried under vacuum for 24 h at 100° C.

Stress Adjustment and Observation:

The above polymer film was uniaxially stretched to maintain an external force.

Scanning heating is performed on the surface of the film in a specific path using a laser Placed in front of the polarized light source and observed using a polarizing plate.

Example 7-9

Replace the polycaprolactone diol in Example 5 with polyethyleneglycol-propyleneglycol adipate, polydiethyleneglycol adipate, poly-1,4-butyleneglycol adipate and apply the isocyanate-hydroxyl crosslinking chemistry.

Example 10-11

Replace the pentaerythritol tetrakis(3-mercaptopropionate) in Example 1 and 2 with pentaerythritol tetrakis(2-mercaptoacetate), a similar result is obtained.

Example 12

Replace the glutaric anhydride in example 4 with decanedioicacid, a similar result is obtained.

Example 13 (Supramolecular System)

a) Polyethylene glycol diacrylate (PEGDA), relative molecular weight 700, from Aladdin
b) Tetrakis(3-mercaptopropionic acid) pentaerythritol ester (PTME), from Sigma-Aldrich
c) 2,2'-(1,2-Ethylenedioxy)diethyl mercaptan (EDT), from Sigma-Aldrich
d) photoinitiator (12959) 2-hydroxy-4'-(2-hydroxyethoxy)-2-methylpropiophenone, from TCI
e) Isopropyl methacrylate (IEMA), from Sigma-Aldrich
f) 2-amino-4-hydroxy-6-methylpyrimidine (MIS), from Sigma-Aldrich
e) N,N-dimethylformamide (DMF)), from Sigma-Aldrich.
g) Dimethyl sulfoxide (DMSO), from Sigma-Aldrich;

Preparation Methods:

1. Preparation of a Hydrogen Bond Monomer (UPyMA) with a Reactive Group 3.00 g of MIS was added to 30 ml of DMSO, and the temperature was raised to 140° C. in the flask to dissolve completely. Then, 3.72 g of IEMA was added for 10 min, and then the solution was quenched in a water bath to room temperature to precipitate and then filtered. The precipitate was washed with ethanol and dried at 80° C. overnight, and a white powder was obtained.

The reaction process is as follows:

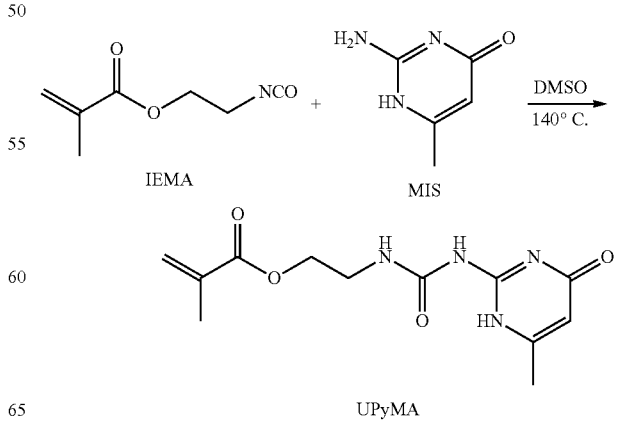

2. Preparation of Polymer Film 0.400 g UPyMA, 0.087 g PTME, 0.130 g EDT, 0.250 g PEGDA and 0.006 g photoinitiator were added to 2 ml DMF, where the ratio of UPyMA:PTME:EDT:PEGDA molar ratio was 8:1:4:2. The mixture was uniformly stirred by magnetic stirring at 90° C., transferred to a Petri dish, photocured for 180 seconds, and baked in a vacuum oven at 100° C. for 12 hours to form a film.

Stress Adjustment and Observation:

The above polymer film was heated to 70° C., uniaxially stretched, cooled, and the external force was removed. Scanning heating is performed on the surface of the film in a specific path using a laser. The fabricated material is placed in the polarized light and observed with a polarizing plate.

It is to be appreciated that the foregoing description of the invention has been presented for purpose of illustrations and explanation and is not intended to limit the invention to the precise form of practice herein. It is to be appreciated therefore, that changes may be made by those who are skilled in the art without departing from the spirit of the invention.

What is claimed is:

1. A method of controlling stress distribution in a material, comprising the steps of:
   a) preparing a first crosslinked polymer containing reversible exchange bonds or a second crosslinked polymer containing reversible exchange bonds, wherein the first crosslinked polymer has a glass transition temperature ($T_g$) higher than room temperature, and the second crosslinked polymer has a $T_g$ lower than room temperature;
   b) heating the first crosslinked polymer to a temperature above $T_g$ and applying an external force to the first crosslinked polymer to cause a strain, or applying an external force to the second crosslinked polymer to cause a strain;
   c) removing the external force after the first crosslinked polymer is strained and temperature is decreased below $T_g$, or maintaining the external force to the second crosslinked polymer to keep the strain;
   d) after step c), selectively heating a region of the first crosslinked polymer or the second crosslinked polymer while maintaining the strain, so as to control presence and magnitude of the stress in the region.

2. The method of claim 1, wherein the selective heating is scanning and heating according to a path using a laser.

3. The method of claim 1, wherein the selective heating is direct localized heating using a digitized infrared light source.

4. The method of claim 1, wherein when the first crosslinked polymer containing reversible exchange bonds or the second crosslinked polymer containing reversible exchange bonds is prepared, a photothermal agent is introduced inside or on a surface of the first crosslinked polymer or the second crosslinked polymer; and
   the selective heating is selecting a digital light source matched with the photothermal agent.

5. The method of claim 1, wherein when the first crosslinked polymer containing reversible exchange bonds or the second crosslinked polymer containing reversible exchange bonds is prepared, a photothermal agent is regionally deposited on a surface of the first crosslinked polymer or the second crosslinked polymer; and
   the selective heating is selecting a light source matched with the photothermal agent for global illumination.

6. The method of claim 4, wherein the photothermal agent is selected from a group consisting of graphite, carbon nanotubes, graphene, and organic ligands of gold, neodymium, samarium, and iridium.

7. The method of claim 5, wherein the photothermal agent is selected from a group consisting of graphite, carbon nanotubes, graphene, and organic ligands of gold, neodymium, samarium, and iridium.

8. The method of claim 5, wherein the regionalized deposition of the photothermal agent comprises: preparing a printer toner with photothermal effects, and printing a grayscale image on the surface of the first crosslinked polymer film or the second crosslinked polymer by a computer graphics assist software.

9. A method of reading information in a polarized light field, comprising the steps of:
   a) preparing a first crosslinked polymer film containing a reversible exchange bond or a second crosslinked polymer film containing reversible exchange bonds, wherein the first crosslinked polymer film has a glass transition temperature ($T_g$) higher than room temperature and the second crosslinked polymer film has a $T_g$ lower than room temperature;
   b) heating the first crosslinked polymer film to a temperature above $T_g$ and applying an external force to the first crosslinked polymer film to cause a strain, or applying an external force to the second crosslinked polymer film to cause a strain;
   c) removing the external force after the first crosslinked polymer film is strained and temperature is decreased below Tg, or maintaining the external force to the second crosslinked polymer film to keep the strain;
   d) after step c), selectively heating a region of the first crosslinked polymer film while maintaining the strain of the first crosslinked polymer film, or selectively heating a region of the second crosslinked polymer film while maintaining the strain of the second crosslinked polymer film;
   e) the first crosslinked polymer film or the second crosslinked polymer film was placed in front of the polarized light source, and the pattern was observed by using a polarizing plate.

10. The method of claim 9, further comprising the step of preparing printer toner with photothermal effects, and printing a grayscale image on the surface of the first crosslinked polymer film or the second crosslinked polymer film using a printer.

* * * * *